United States Patent [19]

Divsalar et al.

[11] Patent Number: 5,023,889
[45] Date of Patent: Jun. 11, 1991

[54] TRELLIS CODED MULTILEVEL DPSK SYSTEM WITH DOPPLER CORRECTION FOR MOBILE SATELLITE CHANNELS

[75] Inventors: Dariush Divsalar, Pacific Palisades; Marvin K. Simon, La Canada, both of Calif.

[73] Assignee: California Institute of Technology, Pasadena, Calif.

[21] Appl. No.: 200,742

[22] Filed: May 31, 1988

[51] Int. Cl.$^5$ .................. H04L 27/18; H04L 1/00
[52] U.S. Cl. ........................................ 375/27; 371/43; 375/53; 375/85; 375/97; 375/34
[58] Field of Search .................. 375/27, 34, 44, 52, 375/53, 54, 56, 57, 67, 83, 84, 85, 97; 371/43, 44, 45; 332/103; 329/304, 310

[56] References Cited

U.S. PATENT DOCUMENTS

| | | | |
|---|---|---|---|
| 3,550,082 | 12/1970 | Tong | 375/114 |
| 3,891,959 | 6/1975 | Tsuji et al. | 371/43 |
| 4,035,767 | 7/1977 | Chen et al. | 371/43 |
| 4,077,021 | 2/1978 | Csajka et al. | 371/43 |
| 4,346,472 | 8/1982 | Ohkoshi et al. | 371/43 |
| 4,447,908 | 5/1984 | Chevillat et al. | 375/67 |
| 4,641,327 | 2/1987 | Wei | 371/43 |
| 4,656,648 | 4/1987 | Vallet | 371/43 |
| 4,660,214 | 4/1987 | Pahlavan et al. | 375/58 |
| 4,756,007 | 7/1988 | Qureshi et al. | 375/8 |

OTHER PUBLICATIONS

"Multiple Trellis Coded Modulation (MTCM)"; Divsalar, D.; Simon, M. K., JPL Publication 86-44, Jan. 1987.

*Primary Examiner*—Benedict V. Safourek
*Attorney, Agent, or Firm*—William J. Benman, Jr.

[57] ABSTRACT

A trellis coded multilevel differential phase shift keyed mobile communication system. The system of the present invention includes a trellis encoder for translating input signals into trellis codes; a differential encoder for differentially encoding the trellis coded signals; a transmitter for transmitting the differentially encoded trellis coded signals; a receiver for receiving the transmitted signals; a differential demodulator for demodulating the received differentially encoded trellis coded signals; and a trellis decoder for decoding the differentially demodulated signals.

24 Claims, 11 Drawing Sheets

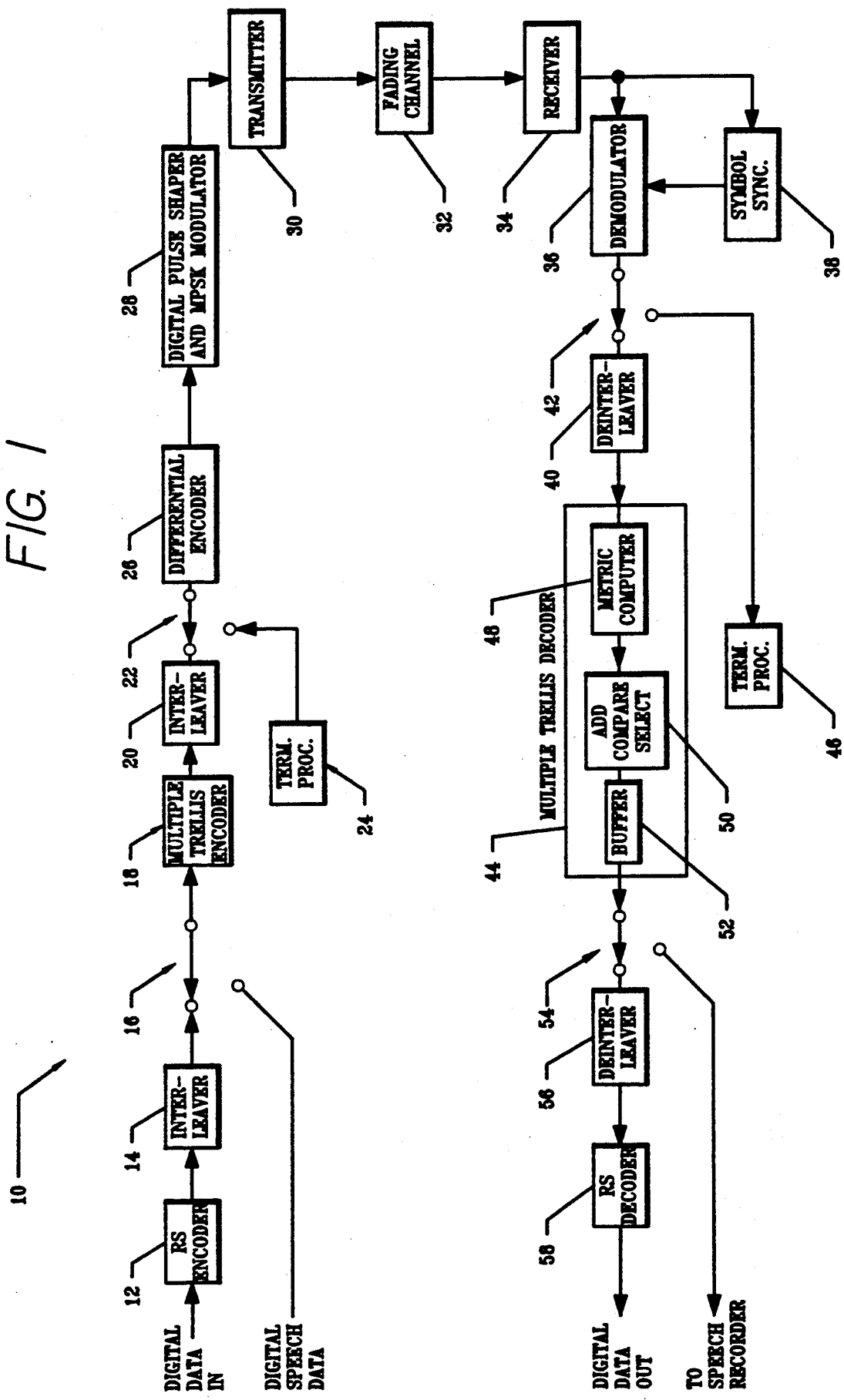

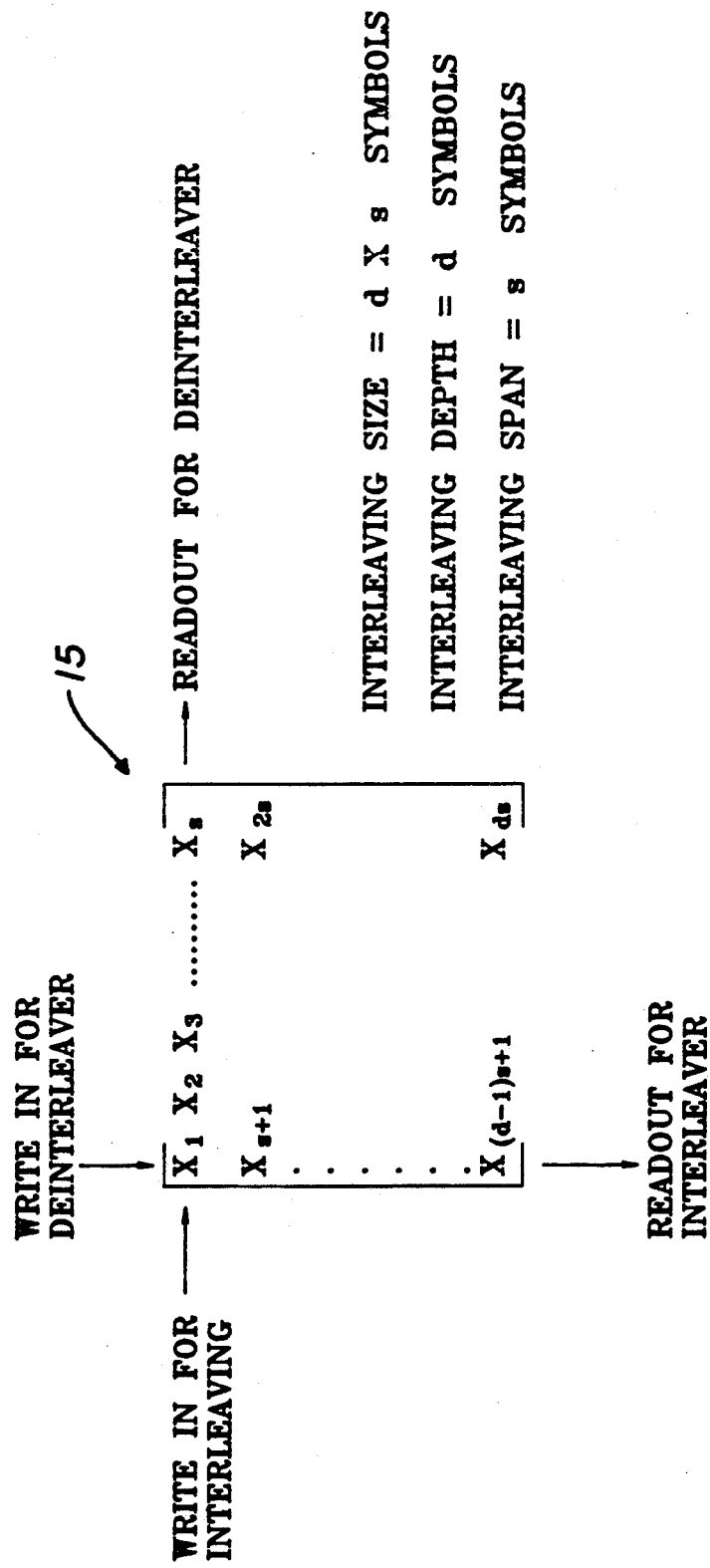

FOR BLOCK CODES:
- d = SHOULD BE CHOSEN BASED ON ANTICIPATED BURST SYMBOL ERROR DURATION
- s = BLOCK LENGTH OF CODE

FOR TRELLIS CODES:
- d = SHOULD BE CHOSEN IN ORDER OF ANTICIPATED LENGTH OF FADE DURATION
- s = SHOULD BE IN ORDER OF TRELLIS DECODER BUFFER SIZE (INTEGRATION TIME OF DECODER)

FIG. 4(b)(1)

SIGNAL SET CONSTRUCTION FOR 4PSK AND K=2

$$A_0 = \begin{Bmatrix} 00 \\ 22 \end{Bmatrix}$$

$$A_1 = A_0 + 02 = \begin{Bmatrix} 02 \\ 20 \end{Bmatrix}$$

$$B_i = A_i + 11 \quad i = 0, 1$$

$$B_0 = \begin{Bmatrix} 11 \\ 33 \end{Bmatrix}$$

$$B_1 = \begin{Bmatrix} 13 \\ 31 \end{Bmatrix}$$

FIG. 4(b)2  SIGNAL SET CONSTRUCTION

| SIGNAL SETS | NUMBER of ELEMENTS PER SET | SET DISTANCE |
|---|---|---|
| 1) $A_0 = \begin{Bmatrix} 0000 \\ 4444 \end{Bmatrix}$ | 2 | $d^2(A_i) = 16$ |
| $A_1 = A_0 + 0044$ | 2 | $d^2(A_i, A_j) = 8$ |
| $A_2 = A_0 + 0404$ | 2 | $i \neq j = 0,1,2,...,7$ |
| $A_3 = A_0 + 4004$ | 2 | |
| $A_{i+4} = A_i + 2222$ | 2 | |
| $i = 0,1,2,3$ | | |
| 2) $B_0 = \bigcup_{i=0}^{7} A_i$ | 16 | $d^2(B_{mi}) = 8$ |
| $B_1 = B_0 + 0022$ | 16 | $d^2(B_{mi}, B_{mj}) = 4$ |
| $B_2 = B_0 + 0202$ | 16 | $m = 0,1,2,3$ |
| $B_3 = B_0 + 2002$ | 16 | $i \neq j = 0,1,2,...,7$ |
| $B_{i+4} = B_i + 0004$ | 16 | $d^2(B_{mi}, B_{(m+1)j}) = 4(2 - \sqrt{2})$ |
| $i = 0,1,2,3$ | | $m = 0,2$ |
| | | $i,j = 0,1,2,...,7$ |
| 2a) $B_{0i} = B_i$ | 16 | $d^2(B_{mi}, B_{(n+2)j}) = 2$ |
| $B_{1i} = B_i + 1111$ | | $m,n = 0,1$ |
| $i = 0,1,2,...,7$ | | $i,j = 0,1,2,...,7$ |
| 2b) $B_{2i} = B_{0i} + 0002$ | 16 | |
| $B_{3i} = B_{1i} + 0002$ | | |
| $i = 0,1,2,...,7$ | | |
| 3) $C_0 = \bigcup_{i=0}^{7} B_i$ | 128 | $d^2(C_i) = 4$ |
| $C_1 = C_0 + 1111$ | 128 | $d^2(C_i, C_{i+1}) = 4(2 - \sqrt{2})$ |
| | | $i = 0,2$ |
| $C_{i+2} = C_i + 0002$ | 128 | $d^2(C_i, C_{j+2}) = 2$ |
| $i = 0,1$ | | $i,j = 0,1$ |
| 3a) $C_{i+4} = C_i + 0011$ | 128 | $d^2(C_i, C_{j+4}) = 2(2 - \sqrt{2})$ |
| $i = 0,1,2,3$ | | $i,j = 0,1,2,3$ |
| 4) $D_0 = C_0 \cup C_1$ | 256 | $d^2(D_i) = 4(2 - \sqrt{2})$ |
| $D_1 = C_2 \cup C_3$ | 256 | $d^2(D_i, D_{i+1}) = 2$ |
| | | $i = 0,2,4,6$ |
| 4a) $D_{i+2} = D_i + 0011$ | 256 | $d^2(D_i, D_{j+m}) = 2(2 - \sqrt{2})$ |
| $D_{i+4} = D_i + 0101$ | 256 | $m = 2,4,6$ |
| $D_{i+6} = D_i + 1001$ | 256 | $i \neq j = 0,1,2,...,7$ |
| $i = 0,1$ | | |
| 5) $E_0 = D_0 \cup D_1$ | 512 | $d^2(E_i) = 2$ |
| | | $i = 0,1,2,...,7$ |
| $E_1 = E_0 + 0011$ | 512 | $d^2(E_{i+m}, E_{j+m}) = 2(2 - \sqrt{2})$ |
| $E_2 = E_0 + 0101$ | 512 | $i,j = 0,1,2,3$ |
| $E_3 = E_0 + 1001$ | 512 | $m = 0,4$ |
| 5a) $E_{i+4} = E_i + 0001$ | 512 | $d^2(E_i, E_{j+4}) = 2 - \sqrt{2}$ |
| $i = 0,1,2,3$ | | $i,j = 0,1,2,3$ |

TRELLIS CODED MULTILEVEL DPSK SYSTEM WITH DOPPLER CORRECTION FOR MOBILE SATELLITE CHANNELS

ORIGIN OF THE INVENTION

The invention described herein was made in the performance of work under a NASA contract and is subject to the provisions of Public Law 96-517 (35 U.S.C. 202) in which the Contractor has elected to retain title.

BACKGROUND OF THE INVENTION

1. Field of the Invention

The present invention relates to communications systems. More specifically, the present invention relates to communications systems operating over fading channels.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Mobile satellite communication systems are typified by the movement of a receiver relative to a transmitter or vice versa. The communications link between transmitters and receivers in mobile communications systems is characterized as a fading channel. Mobile satellite communications systems, having a transponder on a spacecraft and a transceiver on a ground based vehicle, cellular telephone systems and terrestrial microwave systems are examples of communications systems operating over a fading channel. A fading channel is a channel which may be severely degraded due to numerous effects including multipath fading, doppler shifts, doppler spreads and additive noise. In the often used L band, large doppler frequency spreads and shifts due to vehicle movement are particularly problematic.

The conventional solution to the problem of doppler shifts and spreads for mobile communication systems operating at L band was to use pilot tones and coherent demodulation. (See "Dual Pilot Tone Calibration Technique (DPTCT)," by M. K. Simon in IEEE Transactions on Vehicular Technology, vol. VT-35, no. 2, May 1986, pp. 63–70.) A pilot tone is a signal of a discrete frequency in the spectrum within the data band which is transmitted with the data, demodulated and used to recover the data. As is known in the art, the ideal place for the pilot tone is in the center of the data band. Unfortunately, a pilot tone in the center of the data band would interfere with the data. Accordingly, it was necessary to shape the data spectrum to provide a notch for the pilot tone. There are at least three disadvantages with this approach. First it required the reshaping of the data spectrum, adding the cost and complexity of the system. Second, it necessitated an expansion of the bandwidth of the system. This is particularly problematic in mobile satellite communication systems which are typically severely limited in bandwidth and power. Finally, the need for guard bands around the pilot tone, in the notch, amounts to a waste of available bandwidth.

These problems are ostensibly addressed somewhat by dual tone systems which provide discrete carrier tones at the edges of the data band which are beat together in the receiver to provide a tone in the middle of the band. The problems with these systems is that when multiple channels of data are transmitted, there is a pilot tone between each of the data bands. This presents the potential for adjacent channel interference. In addition, the need for guard bands around the pilot tones, also causes some bandwidth expansion.

Thus, there is a need in the art for a mobile communication system which addresses the problem of doppler shifts and spreads while conserving bandwidth and without impairing the performance or imposing significant additional power requirements on the system.

SUMMARY OF THE INVENTION

The need in the art is addressed by the present invention which in a system embodiment provides a trellis coded multilevel differential phase shift keyed mobile communication system. The system of the present invention includes a trellis encoder for translating input signals into trellis codes; a differential encoder for differentially encoding the trellis coded signals; a transmitter for transmitting the differentially encoded trellis coded signals; a receiver for receiving the transmitted signals; a differential demodulator for demodulating the received differentially encoded trellis coded signals; and a trellis decoder for decoding the differentially demodulated signals.

BRIEF DESCRIPTION OF THE DRAWINGS

FIG. 1 shows a block diagram of an illustrative embodiment of the trellis coded multilevel differential phase shift keyed mobile communication system of the present invention.

FIGS. 2(a) and 2(b) illustrate the block interleaving operation of the present invention.

FIG. 4(b) is a trellis diagram for a multiple trellis code modulation system.

DESCRIPTION OF THE INVENTION

Figure 2B:
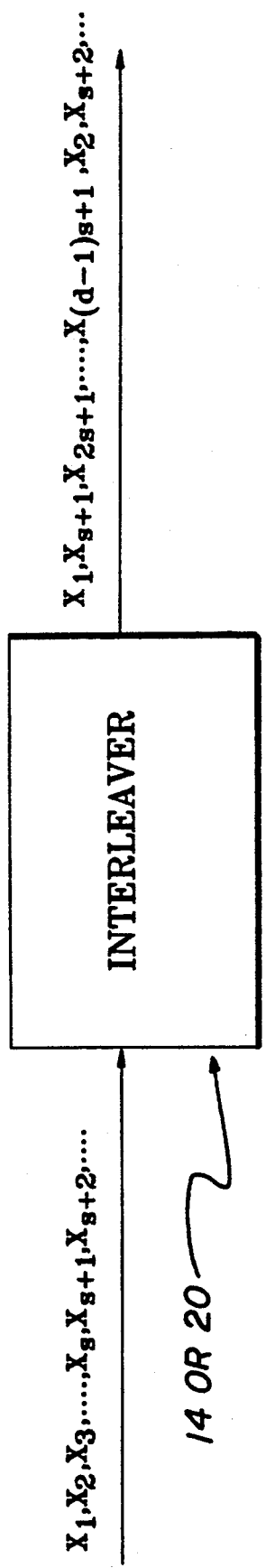

A block diagram of a specific preferred illustrative embodiment of the trellis coded multilevel differential phase shift keyed mobile communication system of the present invention is shown in FIG. 1. As described in greater detail below, the transmitter subsystem of the communication system 10 of the present invention includes a Reed Solomon encoder 12, an interleaver 14, a first switch 16, a trellis encoder 18, another interleaver 20, a second switch 22, a differential encoder 26, a digital pulse shaper and an MPSK modulator 28, and a transmitter 30. The receiver section of the communication system 10 of the present invention includes a receiver 34, a demodulator 36, a deinterleaver 40, a switch 42, a trellis decoder 44, a second switch 54, a second deinterleaver 56 and a Reed Solomon decoder 58.

The encoder 12 and associated interleaver 14 are optional and is not critical for the invention. Although other encoding techniques may be used within the scope of the present invention, a Reed Solomon (RS) encoder 12 is used, in the preferred embodiment, as such encoders are known to be efficacious in the correction of burst errors in applications where the delay associated with Reed Solomon coding may be tolerated. (As used herein, the term "burst" refers to a burst in time, not amplitude.) As is known in the art, the Reed Solomon encoder 12 receives a block of input data and adds a number of redundant symbols thereto.

The interleaver 14 and deinterleaver 56 operate to spread burst errors induced by the trellis decoder 44 over several RS code blocks to facilitate the correction of the errors induced thereby. FIGS. 2(a) and 2(b) illustrate how the interleaver 14 and deinterleaver 56, of the preferred embodiment (using "block" interleaving), organize input symbols from the encoder 12 into a block matrix 15. The symbols are written into the rows of the matrix and read out of the columns. The matrix 15 of FIG. 2(a) has an interleaving span of s symbols (number of columns), an interleaving depth of d symbols (number of rows), and an interleaving size of d times s symbols. As illustrated in FIG. 2(b), the interleaving depth should be chosen equal to the maximum length of burst error duration.

Figure 3A:
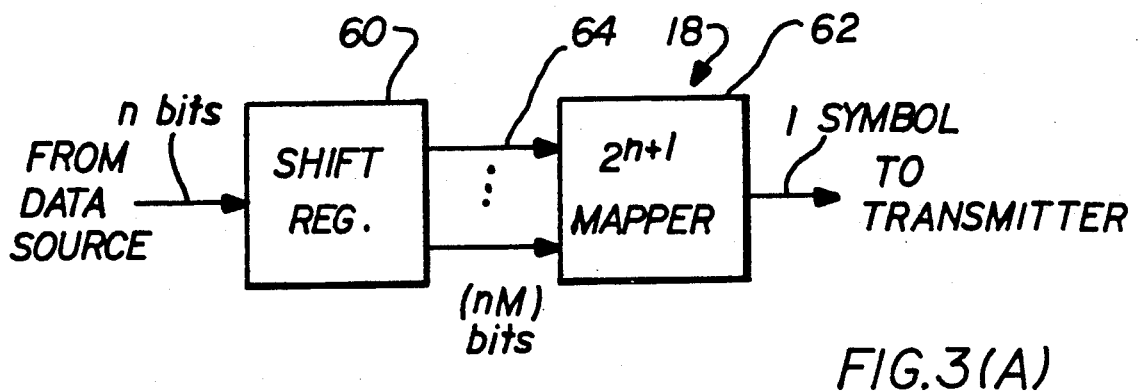
FIG. 3(a), is a block diagram of a conventional trellis code modulation system.

A switch 16 selects either the interleaved encoded data symbols from the interleaver 14 or digital speech data from a vocoder (not shown) or other suitable device for input to a trellis encoder 18. The trellis encoding provides symbol error correction without bandwidth expansion while conserving power. The trellis encoder 18 may be a conventional trellis encoder or a multiple trellis encoder, such as that described in U.S. Pat. No. 4,922,507 issued to Applicants' entitled Multiple Trellis Coded Modulation, Ser. No. 07/127,117, filed Nov. 31, 1987, which is designed specifically for the fading channel. FIG. 3(a) shows a conventional trellis encoder 18 including one (or several shift) register(s) (with logic elements such as exclusive OR's and special connection between stages of shift register(s) to the (n+1) outputs through the logic elements) 60 and a mapper 62. The shift register 60 groups n bits of data, input serially or in parallel from a conventional data source (not shown), and provides an intermediate digital output on n+1 lines 64 corresponding thereto. The mapper 62 may be implemented with discrete logic or with a read-only-memory (ROM). The mapper 62 translates the signals on lines 64 into symbols in accordance with a symbol assignment which is optimized for a particular communication channel. That is, the symbol assignments are made, in a manner known in the art, to optimize the distance properties of the code, i.e., to provide optimal performance by minimizing bit error probability for a given bit energy-to-noise ratio $E_b/N_o$ and throughput. The symbols output from the mapper 62 are subsequently transmitted by conventional means.

Thus, for every n input bits, the conventional encoder 18 provides one MPSK output symbol and therefore has a throughput of n. The rate of the encoder 18 is n/n+1 where n is an integer, e.g. $\frac{1}{2}$ where n=1.

Figure 3B:
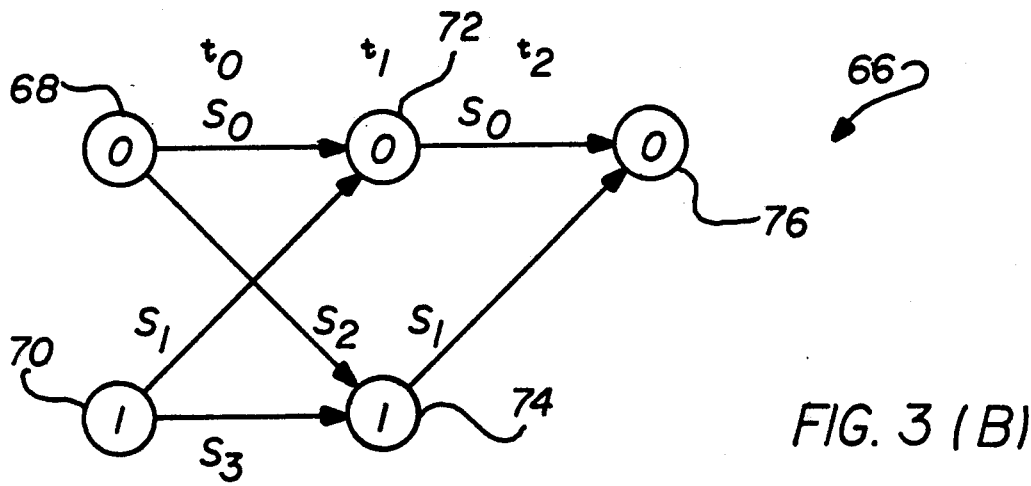
FIG. 3(b) is an illustrative trellis diagram of a conventional trellis code modulation system.

The performance of the conventional encoder 18 may be modeled by the trellis diagram 66 of FIG. 3(b). For example, for n=1 and a two state code, at time $t_o$, the possible states of the shift register 60 are "0" and "1" as indicated at 68 and 70 in the diagram 66. The state of the register 60 is representative of the last bit in the register in this case. Whether the register 60 is in a "0" state or a "1" state (68 or 70) the possible states of the register 60 at time $t_1$ are again "0" and "1" (shown at 72 and 74 respectively). Similarly, state "0" at time $t_2$ is shown at 76. The transitions from a state in one time period to a state in a subsequent time period for a given n bit input (where n=2 in the preferred embodiment) is represented by a single path which is assigned a symbol. For example, $S_O$ represents a symbol along a transition from a state "0" to a state "0", while $S_2$ represents a symbol along a transition from a "0" to a "1". Similarly, $S_1$ represents a transition from a "1" to a "0", while $S_3$ represents a symbol along a transition from a "1" to a "1". Note that only one path (one output symbol) is provided between states for a given n bit input, where, again, n=2 in the preferred embodiment. Note also that the diagram resembles a trellis hence the designation "trellis coded modulation".

Multiple trellis coding, as disclosed in the above-identified U.S. Pat. No. 4,922,507, provides improved performance with MPSK modulations. FIG. 4(a) shows an alternative implementation of the encoder using a multiple trellis coded modulation (MTCM) system 18'. The MTCM system 18' includes a shift register 60' and a mapper 62'. In the simplest case, the system 18' receives nk bits of data from a data source and provides k groups of n+1 intermediate outputs from the shift register 60' on lines 64'. The mapper 62' receives the signals on the k groups of lines and outputs to a transmitter (not shown) k symbols one corresponding to each of the k groups of intermediate outputs. That is, the mapper 62' outputs one of $2^{n+1}$ symbols for each of the k groups of n+1 lines. The throughput of the MTCM encoder 18' is nk/k=n, the same as that of the corresponding conventional trellis encoder 18. Thus, one feature of multiple trellis encoding is that the throughput remains unchanged yet the performance is improved for a given bit energy-to-noise ratio. Here, as with the conventional encoder 18, the mapper 62' outputs symbols in accordance with a symbol assignment or code that is designed to minimize the probability of bit error $P_b$.

At this point, it is illustrative to show how to generate k-tuple signal sets of MPSK symbols required to assign on transitions between states of MTCM. First consider a k-tuple of all zero sequence. Then consider a k-tuple sequence of all M/2 symbols. Let the union of these two sequences be $A_o$. Clearly, the intra-set distance square $d^2(A_o)$ of $A_o$ is 4k, if we assume that the magnitudes of the MPSK signals are unity. Next, add the k-tuple sequence:

$$00 \ldots 0 s^{(n)} j 0 \ldots 0 s^{(n)}_{k-m+2} \ldots s^{(n)}_k$$

to set $A_o$ modulo M, for n+1, when $m=k/(2^n)$, and $s^{(n)}_i=M/2^n$ at the ith position from the left in the sequence. Doing this for all j=1, k−m+1 generates $A_1$, $A_2$, ... $A_{k−m+1}$. Next, add the k-tuple sequence of all $M/2^{n+1}$ to $A_i$'s for n=1 to generate new sets. Repeat the above steps by increasing n each time by one. This results in large intra-distances in the generated sets and also large inter-distances between sets. An example of this construction is shown in Table 1 for k=2 and M=4 which was used in FIG. 4(b) and in Table 2 for k=4 and 8PSK, i.e., M=8. Then for a given number of states and throughput, we can use the generated sets and assign to transitions between states in a manner described in applicants copending application entitled Multiple Trellis Coded Modulation. As an example, consider the 32 state half-connected trellis of FIG. 4(c) with b=nk=8 and k=4. The throughput of this MTCM is b/k=2 bps/Hz. We assign the $B_{oi}$'s and $B_{li}$'s of Table 2 to the paths leaving the odd-numbered states (beginning with state #1) and each time permuting the assignment by one. Similarly, we assign $B_{2i}$'s and $B_{3i}$'s of Table 2 to the paths leaving the even-numbered states with the same permutation. When this is done, we can show that the minimum distance path will be of length 2 and thus the squared free distance for the code is:

$$\begin{aligned} d^2_{free} &= d^2(B_{oi}, B_{oj})|_{i \neq j} + d^2(B_{oi}, B_{ij})|_{i \neq j} \\ &= 4 + 4(2 - 2^{\frac{1}{2}}) \\ &= 6.34 \end{aligned}$$

Figure 4:
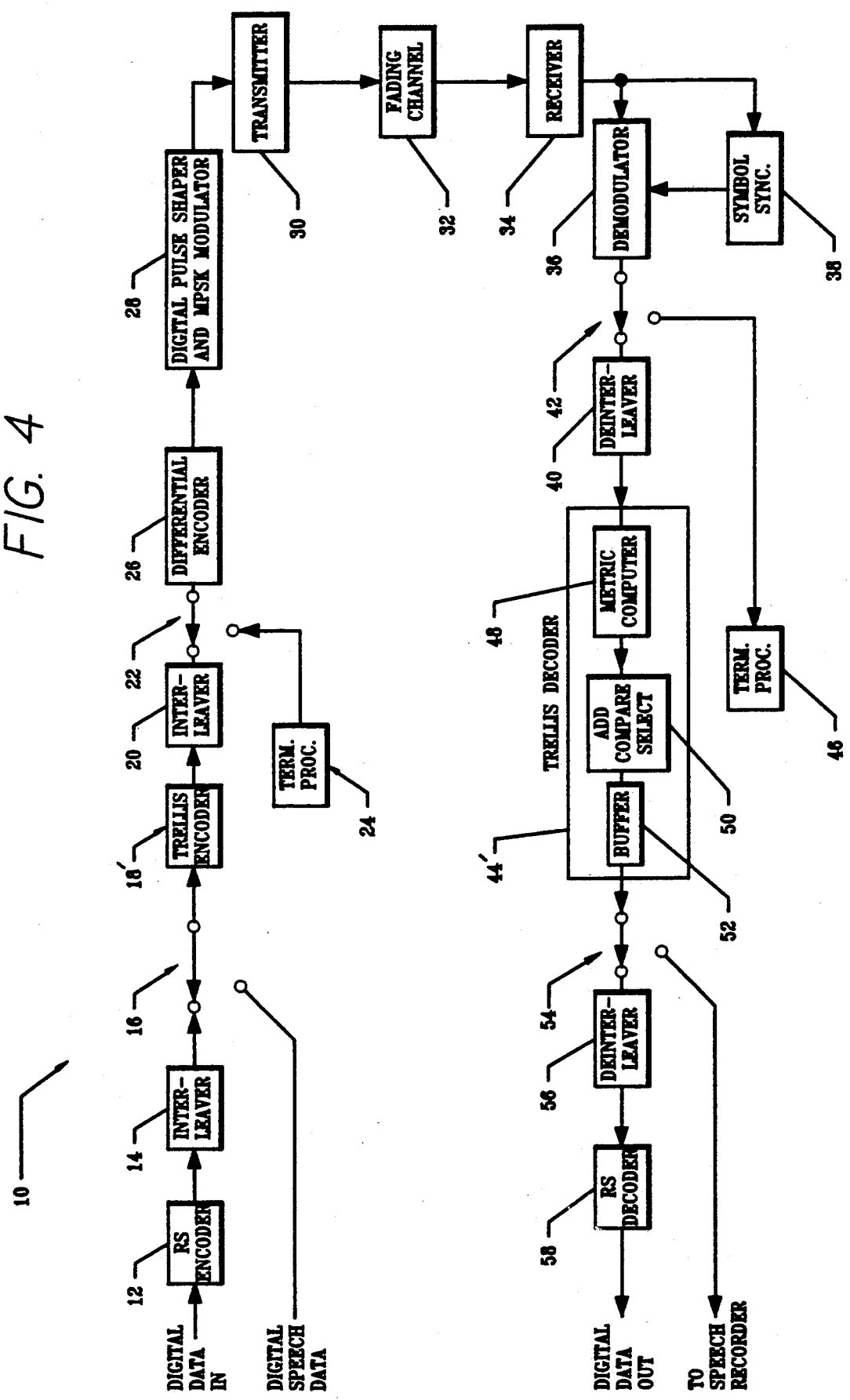
FIG. 4 shows a block diagram of an illustrative embodiment of the multiple trellis coded multilevel differential phase shift keyed mobile communication system of the present invention.
Figure 4A:
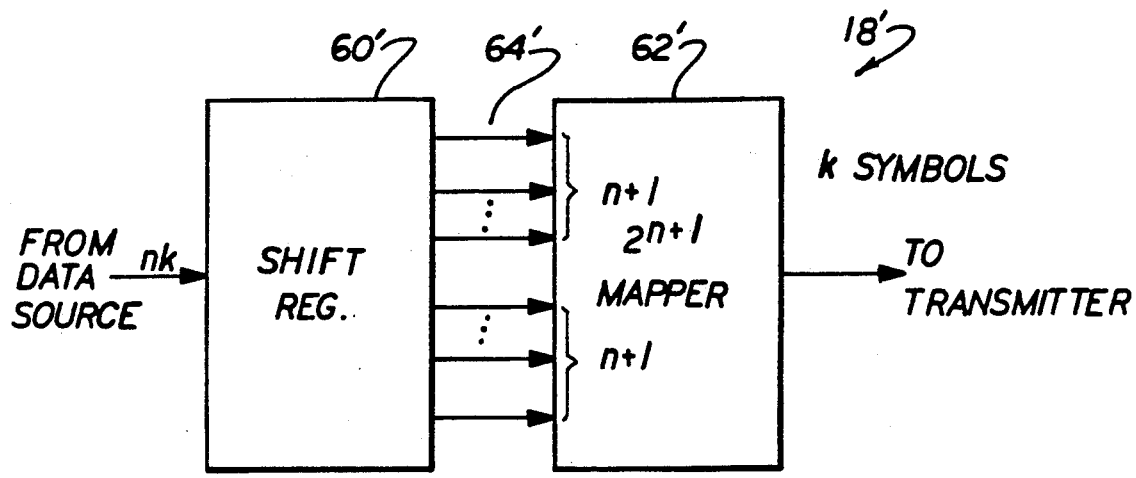
FIG. 4(a) is a block diagram of a multiple trellis code modulation system.
Figure 4:
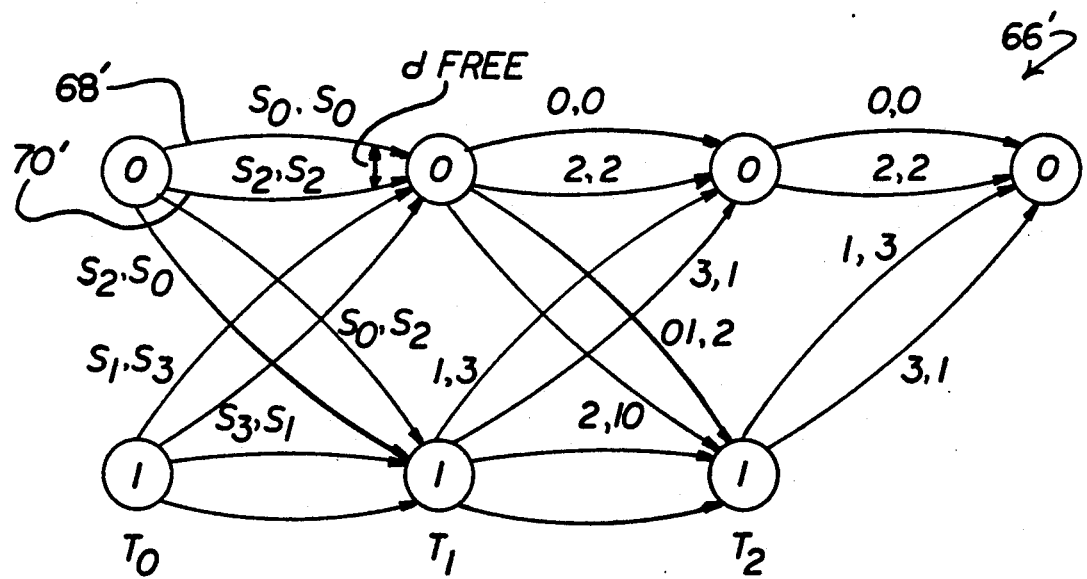
Figure 4C:
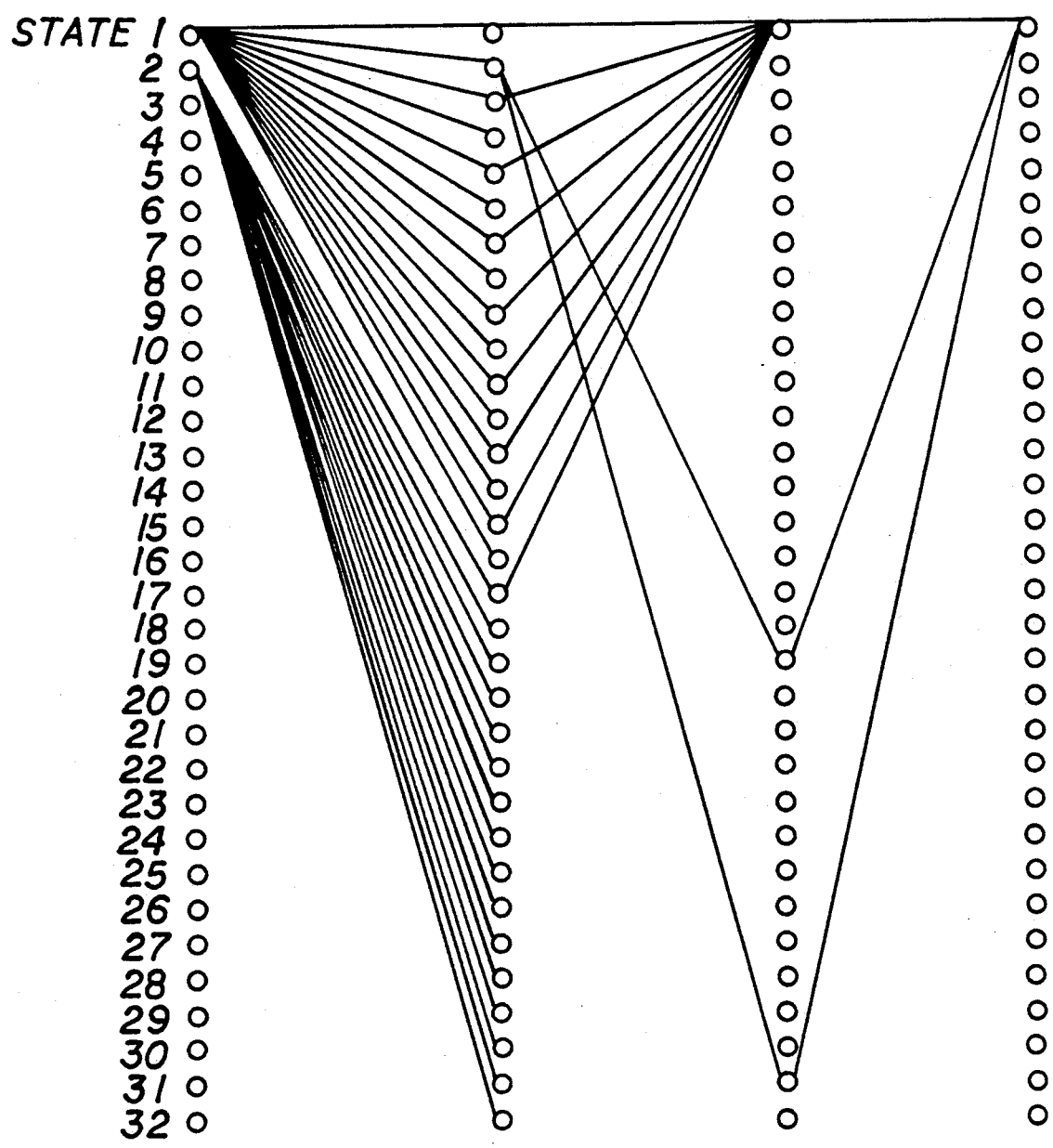
FIG. 4(c) shows a 32 state multiple trellis code system having a k=4.

In FIG. 4(c), the transitions from state number (2n−1) to state 1, 2, ..., 16 and the transitions from state number (2n) to states 17, 18, 19, ..., 32 are shown for n=1 and not for n=2, 3, ..., 16. Note that if in MTCM we set the number of states to one, for k=8, 16, ..., using the concept of signal set construction described above, taking the union of sets, we can generate block codes with MPSK signaling with throughputs greater than or equal to one. That means these block codes will not expand bandwidth as conventional block codes. Naturally, at receiver a trellis decoder with soft decisioning can be used. This is due to trellis structure property of the signal sets construction described above.

In the more general case, the system 18' receives 'b' bits of data from a data source and provides 's' intermediate outputs from the shift register 60' on lines 64' ('b' and 's' being arbitrary integers with the constraint b+1≦s). The 's' intermediate outputs are divided into k groups of $s_i$ bits each where the summation of the $s_i$'s is equal to s. Further, note that the number of bits $s_i$ can be mapped into one of $M_i$PSK symbols when $2^{s_i-1} < M_i \leq 2^{s_i}$. For a multiple trellis code, to design a good code the following condition should hold:

$$b + 1 \leq \sum_{i=1}^{k} \log_2 M_i$$

This implies that for Multiple trellis codes nonconventional modulations such as 3 PSK, 5 PSK, 6 PSK, 7 PSK and so on (where M can be any integer greater than or equal to 2) can be used so long as the above inequality holds. This type of modulation may have an advantage for synchronization purposes. This is due to the fact that a lower level modulation will have a larger minimum distance and will therefore be less sensitive to phase errors and doppler induced phases. This lower level modulation can be detected before decoding and then be provided to phase or frequency synchronizers. A special case occurs when $M_i = M$ for all i=1, 2, ... k. The mapper 62' receives the signals on the k groups of $s_i$ lines each and outputs to the transmitter k symbols, one corresponding to each of the k groups of intermediate outputs. Thus, the throughput of the MTCM encoder 18' is now b/k which is rational but not necessarily integer.

The performance of the MTCM encoder 18' corresponding to the simplest case illustrated above, may be modeled by the two-state multiple trellis diagram 66' of FIG. 4(b). In the multiple trellis diagram 66', two transition paths emanate from each state to another state. This reflects that for a two state shift register 60' which groups 2 bits at a time (n=1, k=2, and nk=2), there are two possible paths by which the register 60' may remain in a zero state. A first is via the first path 68' which represents an input of bits 0,0 and the second is via the second path 70' which represents an input of bits 1,0. (The last bit in the register determines the state since the group size is larger than the memory size.) Two symbols are assigned to each path so that no matter which path is taken by the encoder 18', two symbols are output corresponding to k=2. For simplicity, only the subscripts are shown for the symbols after the time period $t_1$.

Figure 5:
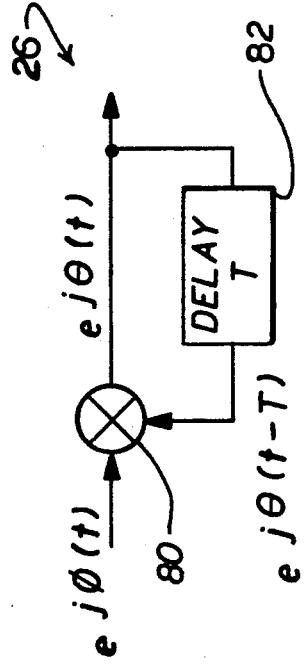
FIG. 5 illustrates the operation of a differential encoder with an input of phase angle only.

The trellis encoded data is input to a second interleaver 20 for fading burst protection in the manner described above with respect to the first interleaver 14. As is illustrated in FIGS. 2(a) and 2(b), the interleaving depth for the interleaver 20 should be chosen equal to the maximum length of fade duration and the interleaving span should be chosen equal to the required trellis decoding integration time which corresponds to the trellis decoder buffer size (for a fading channel with a Rician parameter k=10 db, a ⅜, 16 state, k=1 trellis code, interleaving size of d=16 and s=8 symbols is adequate). The switch 22 operates to selectively pass preamble, identification, unique word and other data formatting information through the system 10 from a terminal processor 24. The terminal processor 24 controls the sequence of operation of elements in the transmitter, controls switches 16 and 22 and formats the data by appending a required preamble and postamble to data packets. In any event, the signal selected by the switch 22 is input to a differential encoder 26. As is known in the art, differential encoders provide an output phase signal which differs from a previous output phase signal by the amount equal to the value of the input phase signal. This is illustrated in FIGS. 5. FIG. 5 illustrates the operation and implementation of the differential encoder 26. The signal from the interleaver 20 is of the form $e^{j\phi(t)}$ and is input to a multiplier 80. The output of the multiplier 80 is of the form $e^{j\theta(t)}$. The output of the multiplier 80 is delayed for one symbol period T by the delay circuit 82 and fed back to the multiplier 80 to provide the second input thereof. The output of the delay circuit 82 is of the form $e^{j\theta(t-T)}$. Thus, the output of the differential encoder 26 is:

$$e^{j\theta(t)} = e^{j\phi(t)} e^{j\theta(t-T)} = e^{j(\theta(t-T) + \phi(t))} \quad [1]$$

Figure 6:
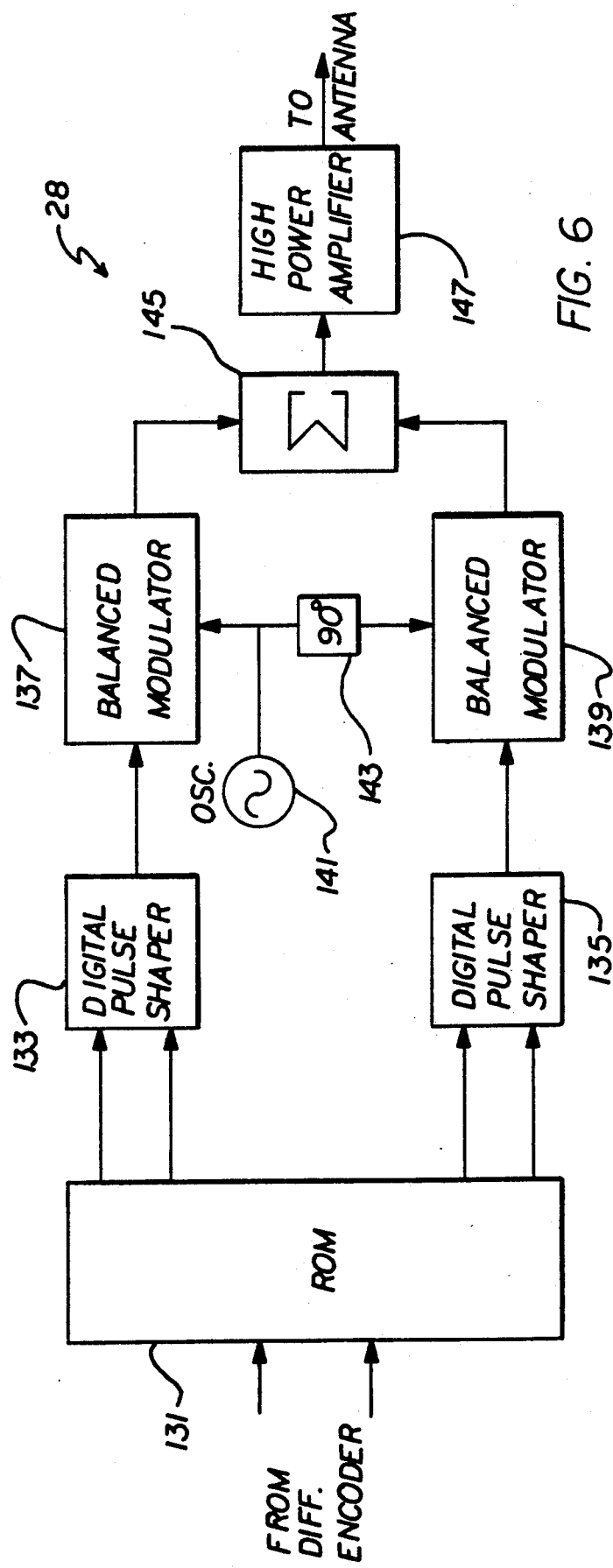
FIG. 6 shows an illustrative implementation of the pulse shaper and 8PSK modulator utilized in the present invention.
Figure 7:
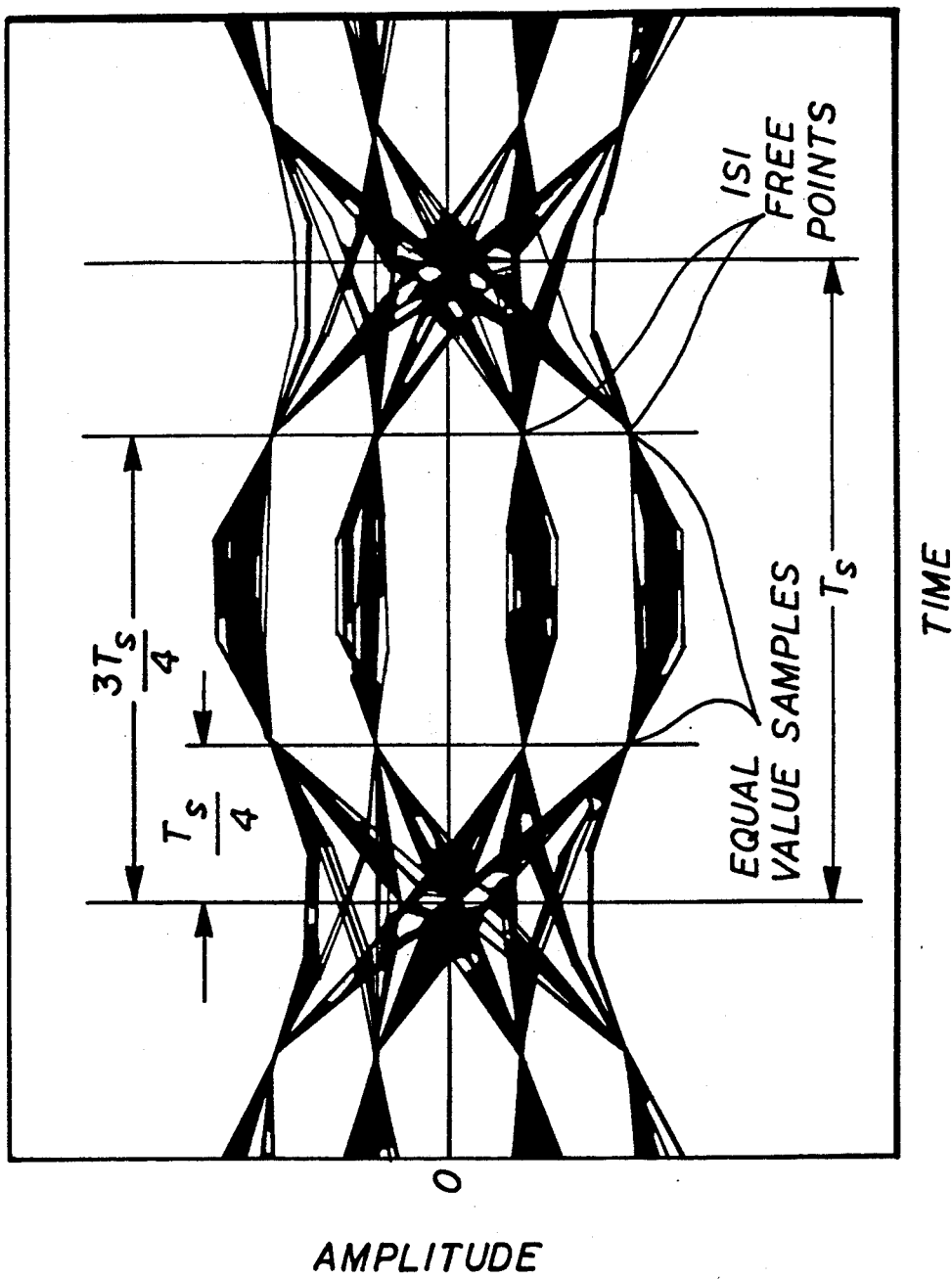
FIG. 7 shows an illustrative eye diagram for a root raised cosine pulse shaping scheme with 100% excess bandwidth.
Figure 8:
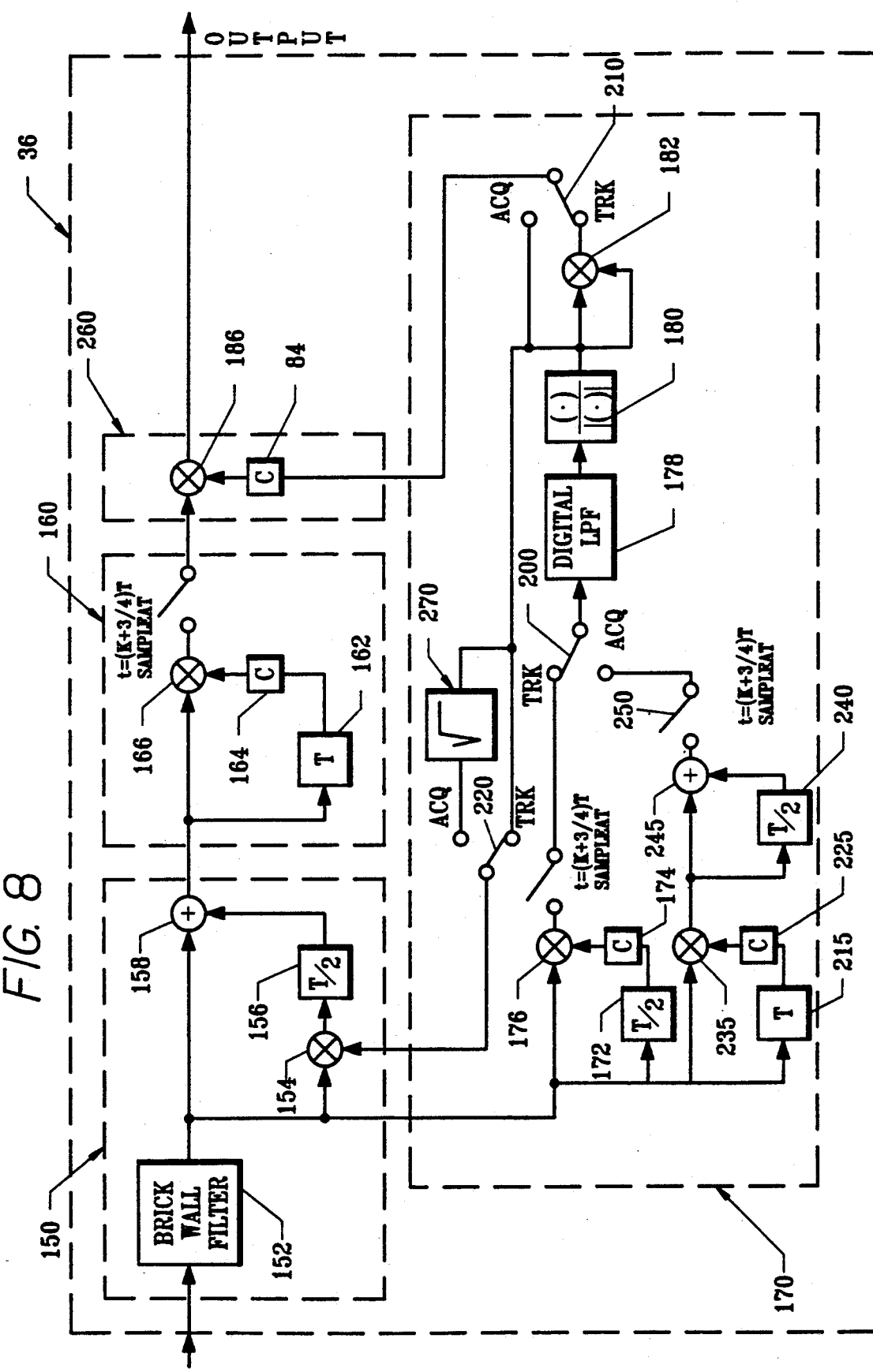
FIG. 8 shows an illustrative implementation of the differential demodulator of the preferred embodiment of the present invention.

The output of the differential encoder 26 is input to a read-only-memory ROM 131 of the digital pulse shaper and MPSK modulator 28. An illustrative implementation of the pulse shaper and MPSK modulator is shown in FIG. 6. The ROM 131 generates I and Q signals each containing $\log_2(M/2)$ bits, where M=8 for 8PSK modulation. The I and Q bit streams are input to identical digital pulse shapers 133 and 135 whose outputs modulate quadrature I and Q carriers using balanced modulators 137 and 139. The I and Q modulated carriers are summed by the summer 145 and provided to a high power amplifier 147 that can be regarded as a part of the transmitter 30. As discussed below, for estimation and correction of doppler induced phase, in the preferred embodiment, the pulse shapers generate symmetric pulses which provide samples of equal value with a symbol time when the samples are taken at intervals of T/2. The samples should also be free of intersymbol interference (ISI). Accordingly, in the preferred embodiment, root raised cosine pulse shaping was employed as it has the desired properties inherently. The samples were taken at the ISI free points thereof. See FIG. 7 which shows the illustrative eye diagram, illustrating the output of the pulse shaper for all possible waveforms mutually superimposed, for a root raised cosine pulse shaping scheme with 100% excess bandwidth.

The output of the amplifier 147 is provided to the antenna subsystem of the transmitter 30 for transmission over the fading channel. The transmitter typically includes amplifiers and antennas as is known in the art.

The receiver section is adapted to receive signals transmitted over the fading channel and includes a receiver 34 having antennas, downconverters and filters as is known in the art. The output of the receiver 34 is input to a differential demodulator 36 which receives timing information from a symbol sync circuit 38. The symbol sync circuit provides the required timing information for demodulation, doppler estimation and decoding. This can be done by taking the square of the envelope of the received signal and filtering the harmonic in the resulting signal corresponding to the symbol rate as is known in the art.

The differential demodulator 36 includes a pseudo matched filter 150, a differential detector 160 and a doppler estimator 170. The pseudo matched filter 150 includes a brick wall filter 152 which, for the modulation scheme of the preferred embodiment, may be implemented with a low pass filter. The bandwidth of this filter should be slightly greater than 1/T. The output of the brick wall filter 152 is fed forward to a multiplier/mixer 154 where it is combined with the output of the doppler estimator 170. The output of the multiplier is shifted by half a symbol period by the delay circuit 156 and combined with the output of the brick wall filter 152 by a summer 158. The pseudo matched filter 150 is approximately matched to the transfer characteristics of the digital pulse shaper in the MPSK modulator 28 so that in the presence of doppler frequency shift, maximum signal to noise ratio at the output of the pseudo matched filter 150 can be achieved. The combination of the output of the doppler estimator with the output of the brick wall filter and T/2 second delay and add operation insures that the filter will indeed provide a suitable match in spite of any doppler shift induced by the channel.

The differential detector 160 receives a signal from the pseudo matched filter 150 of the form:

$$e^{j(\theta(t)+n+wt)}$$

where the amplitude fluctuations and effect of noise have been ignored and the amplitude is assumed to be unity to show the concept without loss of generality, n represents the phase shift induced by the fading channel 32 and wt is the doppler induced phase shift. The differential detector eliminates the phase shift n induced by the channel and recovers the phase of the transmitted signal $\phi(t)$, while the doppler estimator 170 estimates the doppler shift w in the manner described below. The differential detector 160 includes a delay circuit, to which the input signal is fed, which provides an output signal of the form:

$$e^{j(\theta(t-T)+n+w(t-T))}.$$

The conjugate operator 164 provides the reciprocal of the complex output signal of the delay circuit 162 and therefore changes the sign on the exponent such that a signal of the form:

$$e^{-j(\theta(t-T)+n+w(t-T))}$$

is input to the multiplier/mixer 166 for mixing with the input signal. Hence the output of the mixer 166 is:

$$e^{j(\theta(t)-\theta(t-T)+wT)}.$$

Since, $\phi(t) = \theta(t) - \theta(t-T)$, the output of the differential detector is $e^{j\phi(t)+wT}$ which is the complex form of the transmitted phase signal $\phi(t)$ plus the doppler induced phase component wT. At this point assume switches 200, 210, and 220 are in the tracking mode, i.e. connected to the terminal TRK.

The doppler estimator estimates the doppler induced phase component wT by mixing the received filtered signal from the brick wall filter 152 with a delayed conjugated replica thereof. That is, the signal from the filter 152 of the form $e^{j(\theta(t)+n+wt)}$ is delayed by one-half a symbol period T/2 by the delay circuit 172 so that the output of the delay circuit is $$e^{j(\theta(t-T/2)+n+w(t-T/2))}.$$

The sign of the exponent is changed by the conjugate circuit 174 to provide an output of the form:

$$e^{-j(\theta(t-T/2)+n+w(t-T/2))}$$

which is mixed with the input signal by the mixer 176 so that the mixer provides an output signal of the form $$e^{j(\theta(t)-\theta(t-T/2)+w(T/2))}.$$

Since, as discussed above, a pulse shaping scheme is employed which provides symmetric pulses which when sampled at intervals of T/2 provide samples of equal value, the term $\theta(t) - \theta(t-T/2)$ is zero. Hence, the output of the mixer 176 is $e^{jw(T/2)}$. This signal is filtered by the digital low pass filter 178, normalized by the normalizer 180 and squared by the multiplier 182 to provide an estimate of the doppler induced phase shift wT. This estimate of the doppler induced phase shift is subtracted from the output of the differential detector 160 through the conjugate circuit 184 and the mixer 186. Thus, the output of the demodulator 36 is therefore the differentially detected doppler corrected phase signal $\phi(t)$. Usually, at the beginning of each data packet for transmission there is a preamble sequence. This sequence may contain 20 to 30 known phase sequences (e.g. zero phase can be sent for 20 to 30 symbol times) to aid the doppler estimator 170 at the receiver for fast acquisition of doppler frequency shift. Therefore at the beginning of reception of a data packet, the switches 200, 210 and 220 in the doppler estimator 170 of the demodulator 30 are set for the acquisition mode, i.e., the switches are connected to the ACQ terminal. For fast acquisition of doppler, the received filtered signal from the brick wall filter 152 is delayed by a symbol period T by the delay circuit 215 so that the output of the delay circuit after conjugation operation by the circuit 225 is:

$$e^{-j(\theta(t-T)+n+w(t-T))}$$

which is mixed with the input signal by the mixer 235 so that the mixer provides an output signal $$e^{j(\theta(t)-\theta(t-T)+wT)}$$

Since, for fast acquisition, a constant phase is sent, the term $\theta(t)-\theta(t-T)$ is zero. Hence, the output of the mixer 235 is $e^{jwT}$, which is available at $t=(k+\frac{1}{4})T$ and $t=(k+\frac{3}{4})T$ within a symbol time. Since the noise components at these two points are independent, we can add these two samples to enhance the signal-to-noise ratio by 3 db. This is done by delaying the output of the mixer 235 by one half a symbol period T/2 by the delay circuit 240 and then adding to the output of the mixer 235 by the summer circuit 245 and finally sampled at $t=(k+\frac{3}{4})T$ by sampler 250. After filtering by the filter 178 and normalizing by the normalizer 180, the signal $e^{jwT}$ is supplied to a circuit 260 for doppler correction. Also, taking the square root of $e^{jwT}$ by circuit 270, the required estimate of doppler i.e. $e^{jwT/2}$ is provided to the mixer 154. After the fast acquisition is made, the doppler estimator can switch to the tracking mode by open loop doppler estimation where the data phase is not known by the receiver.

Returning now to FIG. 1, the output of the demodulator 36 is selectively switched by the switch 42 from a terminal processor 46, for signal identification, unique word detection and formatting, to a trellis decoder 44. Unique word detection, used for identifying the beginning and end of a data packet, can be done by correlating the unique word pattern stored in the receiver terminal processor 46 against the received hard or soft detected MPSK symbols out of the demodulator 36, then the result of the correlation is compared with a threshold to detect the presence or absence of unique words as is known in the art. The switches 42, 54, 200, 210 and 220 operate under control of the terminal processor 46. The selected output of the demodulator 36 is deinterleaved by the deinterleaver 40. The deinterleaver 40 performs the reverse operation of the interleaver 20 by reconstructing the matrix 15 of FIG. 2(a) and reading the rows thereof. The interleaver and deinterleaver may be implemented with random access memories as is known in the art.

The trellis decoder 44 extracts the data symbols from the trellis encoded symbol stream. The trellis decoder 44 may be implemented with a Viterbi decoder. Viterbi decoders are known in the art. See *Principles of Digital Communication and Coding*, A. J. Viterbi and J.K. Omura, McGraw-Hill Co., New York, N.Y., 1979. The trellis decoder 44 includes a metric computer 48, add, compare and select logic 50 and a buffer 52. As an option for better performance, the envelope of the fading signal can be estimated and provided to the metric computer 48 and also can be used to create erasures for the Reed Solomon decoder. This can be done if the estimated fade sample is below a certain threshold. Also, the end of the buffer 52 usually contains symbols which are equal for all states under normal conditions. If the received signal is affected by several deep fades, the symbols at the end of the buffer will be different. By comparing the symbols at the end of the buffer 52, erasure symbols can be created for the RS decoder.

An output switch 54 routes the decoded signals to a Reed Solomon decoder 58 via a deinterleaver 56, if the transmitted signal was so encoded, or to a speech decoder (not shown) if the input signal was digital speech data.

Thus, the present invention has been described with reference to a particular embodiment for a particular application. Those of ordinary skill in the art will recognize additional modifications, applications and embodiments within the scope of the invention. For example, the invention is not limited to the use of Reed Solomon encoders at the input and the output of the system. Further, the invention is not limited to the particular implementations shown for interleaving, deinterleaving, trellis encoding and decoding, differential encoding and detection, pulse shaping, modulation and demodulation and doppler estimation. The principles and teachings of the present invention may be used separately or in combination without departing from the scope thereof. It is therefore intended by the appended claims to cover any and all such modifications, applications and embodiments.

Accordingly,

What is claimed is:

1. A transmitter for a trellis coded multilevel differential phase shift keyed mobile communication system comprising:
   multiple trellis encoder means for translating input signals into multiple trellis codes;
   differential encoder means for differentially encoding said multiple trellis coded signals; and
   means for transmitting said differentially encoded multiple trellis coded signals.

2. The transmitter of claim 1 including first interleaving means in communication with said multiple trellis encoder means for interleaving said multiple trellis encoded signals.

3. The transmitter of claim 2 including M-ary phase shift keyed modulator means for modulating said differentially encoded signals prior to the transmission thereof.

4. The transmitter of claim 3 wherein said M-ary phase shift keyed modulator means includes a digital pulse shaper.

5. The transmitter of claim 4 including Reed Solomon encoder means for encoding said input signals prior to the multiple trellis encoding thereof.

6. The transmitter of claim 5 including second interleaving means for interleaving said Reed Solomon encoded signals prior to the multiple trellis encoding thereof.

7. A transmitter for a trellis coded multilevel differential phase shift keyed mobile communication system comprising:
   a multiple trellis encoder for translating input signals into multiple trellis codes;
   first interleaving means for interleaving said multiple trellis encoded signals;
   differential encoder means for differentially encoding said interleaved multiple trellis encoded signals;
   M-ary phase shift keyed modulator means for modulating said differentially encoded signals; and
   means for transmitting said modulated signals.

8. The transmitter of claim 7 including Reed Solomon encoder means for encoding said input signals prior to the multiple trellis encoding thereof.

9. The transmitter of claim 8 including second interleaving means for interleaving said Reed Solomon encoded signals prior to the multiple trellis encoding thereof.

10. The transmitter of claim 9 wherein said M-ary phase shift keyed modulator means includes a digital pulse shaper.

11. The transmitter of claim 7 including means for switching between the output of said first interleaving means and the output of terminal processing means for providing signal preamble and identification means for input to said differential encoder means.

12. A receiver for a trellis coded multilevel differential phase shift keyed mobile communication system comprising:
    receiver means for receiving differentially encoded multiple trellis coded signals;
    differential demodulator means for demodulating said received differentially encoded trellis coded signals; and
    multiple trellis decoder means for decoding said differentially demodulated signals.

13. The receiver of claim 12 including first deinterleaving means for deinterleaving said received signals.

14. The receiver of claim 13 wherein said differential demodulator means includes a differential detector.

15. The receiver of claim 12 wherein said differential demodulator means includes doppler estimator means for estimating and removing doppler induced phase shift from said received signals.

16. The receiver of claim 15 wherein said differential demodulator means includes a matched filter.

17. The receiver of claim 15 wherein said multiple trellis decoder means includes a Viterbi decoder.

18. The receiver of claim 15 including a Reed Solomon decoder connected to the output of said multiple trellis decoder.

19. The receiver of claim 18 including a deinterleaver between said multiple trellis decoder and said Reed Solomon decoder.

20. The receiver of claim 15 including switch means for routing the output of a first deinterleaver to a terminal processor for extracting preamble and identification means from said received signal.

21. A receiver for a trellis coded multilevel differential phase shift keyed mobile communication system comprising:
    receiver means for receiving differentially encoded multiple trellis coded signals;
    differential demodulator means for demodulating said received differentially encoded multiple trellis coded signals, said demodulator means including a differential detector and doppler estimator means for estimating and removing doppler induced phase shift from said received signals;
    deinterleaving means for deinterleaving said received signals; and
    multiple trellis decoder means for decoding said differentially demodulated signals.

22. A trellis coded multilevel differential phase shift keyed mobile communication system comprising:
    multiple trellis encoder means for translating input signal into multiple trellis codes;
    differential encoder means for differentially encoding said multiple trellis coded signals;
    means for transmitting said differentially encoded multiple trellis coded signals;
    receiver means for receiving said transmitted signals;
    differential demodulator means for demodulating said received differentially encoded multiple trellis coded signals, said differential demodulator means including a dopple estimator means for estimating and removing doppler induced phase shift from said received signals; and
    multiple trellis decoder means for decoding said differentially demodulated signals.

23. A trellis coded multilevel differential phase shift keyed mobile communication system comprising:
    trellis encoder for translating input signals into trellis codes;
    first interleaving means for interleaving said trellis encoded signals;
    differential encoder means for differentially encoding said interleaved signals;
    M-ary phase shift keyed modulator means for modulating said differentially encoded signals;
    means for transmitting said modulated signals;
    receiver means for receiving said transmitted signals;
    differential demodulator means for demodulating said received differentially encoded trellis coded signals, said demodulator means including a differential detector and doppler estimator means for estimating and removing doppler induced phase shift from said received signals;
    deinterleaving means for deinterleaving said received signals; and
    trellis decoder means for decoding said differentially demodulated signals.

24. A receiver for a trellis coded multilevel differential phase shift keyed mobile communication system comprising:
    receiver means for receiving differentially encoded multiple trellis coded signals;
    differential demodulator means for demodulating said received differentially encoded multiple trellis coded signals;
    doppler estimator means in communication with said differential demodulator means for estimating and removing doppler induced phase shift from said received signals; and
    multiple trellis decoder means for decoding said differentially demodulated signals.

* * * * *

UNITED STATES PATENT AND TRADEMARK OFFICE
CERTIFICATE OF CORRECTION

PATENT NO. : 5,023,889

DATED : June 11, 1991

INVENTOR(S) : Dariush Divsalar and Marvin K. Simon

It is certified that error appears in the above-identified patent and that said Letters Patent is hereby corrected as shown below:

Column 11, line 20, "...encoded trellis...", should be -- encoded multiple trellis --.

Column 12, line 17, "dopple", should be -- doppler --.

Signed and Sealed this

Twenty-fifth Day of May, 1993

Attest:

MICHAEL K. KIRK

*Attesting Officer*    *Acting Commissioner of Patents and Trademarks*